United States Patent
Aoki et al.

(10) Patent No.: US 11,441,525 B2
(45) Date of Patent: Sep. 13, 2022

(54) PORT INJECTION ENGINE

(71) Applicant: KUBOTA Corporation, Osaka (JP)

(72) Inventors: Kosuke Aoki, Sakai (JP); Michisuke Iga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/325,195

(22) Filed: May 19, 2021

(65) Prior Publication Data

US 2021/0363954 A1    Nov. 25, 2021

(30) Foreign Application Priority Data

May 21, 2020 (JP) .............................. JP2020-088593

(51) Int. Cl.
*F02M 69/04* (2006.01)

(52) U.S. Cl.
CPC ................................ *F02M 69/044* (2013.01)

(58) Field of Classification Search
CPC ...... F02M 69/044; F02D 41/34; F02D 41/345
See application file for complete search history.

(56) References Cited

U.S. PATENT DOCUMENTS

| | | | | |
|---|---|---|---|---|
| 4,811,231 A * | 3/1989 | Hataoka | ................. | F02D 41/345 123/188.14 |
| 5,704,333 A * | 1/1998 | Okumura | ............. | F02M 69/047 123/430 |
| 5,934,259 A * | 8/1999 | Onishi | .................. | F02D 41/062 123/491 |
| 10,337,442 B2 * | 7/2019 | Hollar | ....................... | F02B 5/02 |
| 11,293,369 B2 * | 4/2022 | Izumi | .................. | F02D 41/3094 |
| 2011/0100330 A1 * | 5/2011 | Yokoyama | .......... | F02D 41/0025 123/478 |
| 2013/0152903 A1 * | 6/2013 | Leone | ................. | F02D 41/0002 123/491 |
| 2014/0158092 A1 * | 6/2014 | Sukegawa | ............. | F02D 41/182 123/480 |
| 2016/0123268 A1 * | 5/2016 | Kawabe | .................... | F01L 1/34 123/478 |
| 2016/0356229 A1 * | 12/2016 | Watanabe | ............. | F02D 41/402 |
| 2016/0356230 A1 * | 12/2016 | Watanabe | ............. | F02D 41/402 |
| 2020/0240319 A1 * | 7/2020 | Tokunaga | ............. | F02P 5/1504 |

FOREIGN PATENT DOCUMENTS

JP          2019-138169 A       8/2019

* cited by examiner

*Primary Examiner* — Phutthiwat Wongwian
*Assistant Examiner* — Anthony L Bacon
(74) *Attorney, Agent, or Firm* — Panitch Schwarze Belisario & Nadel LLP

(57) ABSTRACT

A port injection engine, in which injected fuel readily vaporizes inside suction ports, includes: a suction port; a suction valve; and a port injector that injects fuel to an inner peripheral surface of the suction port. When the fuel is burned in a predetermined combustion cycle, an injection start of a fuel injection period is set within an end part of a valve opening period before the suction valve is fully closed, during a combustion cycle previous to the predetermined combustion cycle. The end part of the valve opening period is preferably set from 50° to 20° before the suction valve is fully closed at a crank angle.

20 Claims, 5 Drawing Sheets

PORT INJECTION ENGINE

CROSS-REFERENCE TO RELATED APPLICATIONS

This application claims priority under 35 U.S.C. § 119(b) to Japanese Patent Application No. 2020-088593 filed on May 21, 2020, the disclosure of which is incorporated herein by reference in its entirety.

BACKGROUND OF THE INVENTION

(1) Field of the Invention

The present invention relates to port injection engines.

(2) Description of Related Art

Some conventional engines fully close suction valves and then inject fuel from port injectors. Therefore, the injected fuel is less likely to make contact with the suction valves heated by the combustion heat, and the injected fuel may fail to readily vaporize inside suction ports.

SUMMARY OF THE INVENTION

An object of the present invention is to provide a port injection engine in which injected fuel readily vaporizes inside suction ports.

In the present invention, fuel injection starts within an end part of a valve opening period of suction valves during a previous combustion cycle (C0).

In this engine, injected fuel readily vaporizes inside suction ports. Consequently, the engine has enhanced combustion performance and provides high engine output and exhaust performance.

DETAILED DESCRIPTION OF PREFERRED EMBODIMENT

FIGS. 1 to 5 are each an explanatory diagram of a port injection engine according to an embodiment of the present invention. In this embodiment, a port injection type of water-cooled vertical in-line 2-cylinder spark ignition engine will be described.

Figure 2:
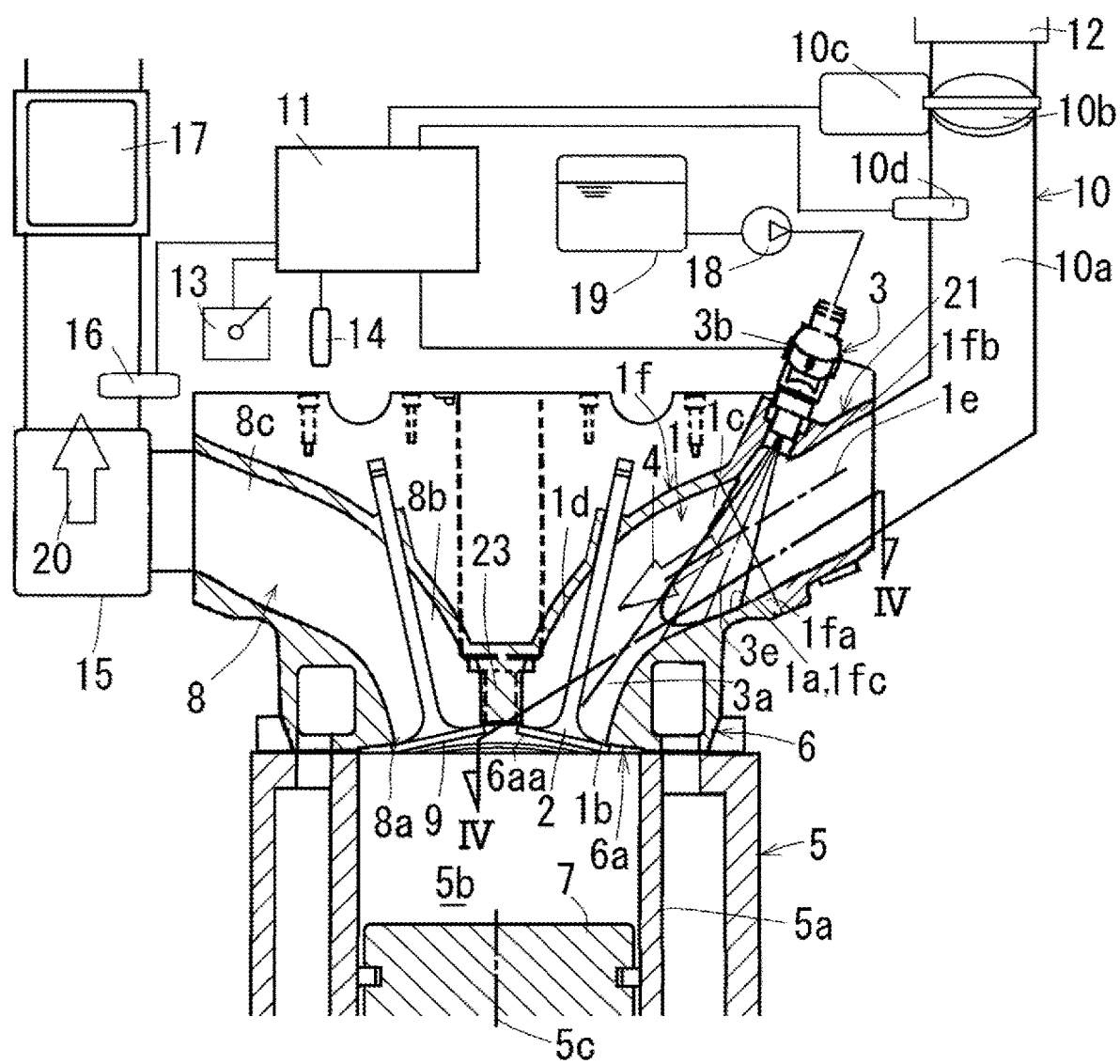
FIG. 2 is a vertically-sectional front view of main parts in the port injection engine according to the embodiment of the present invention.
Figure 3:
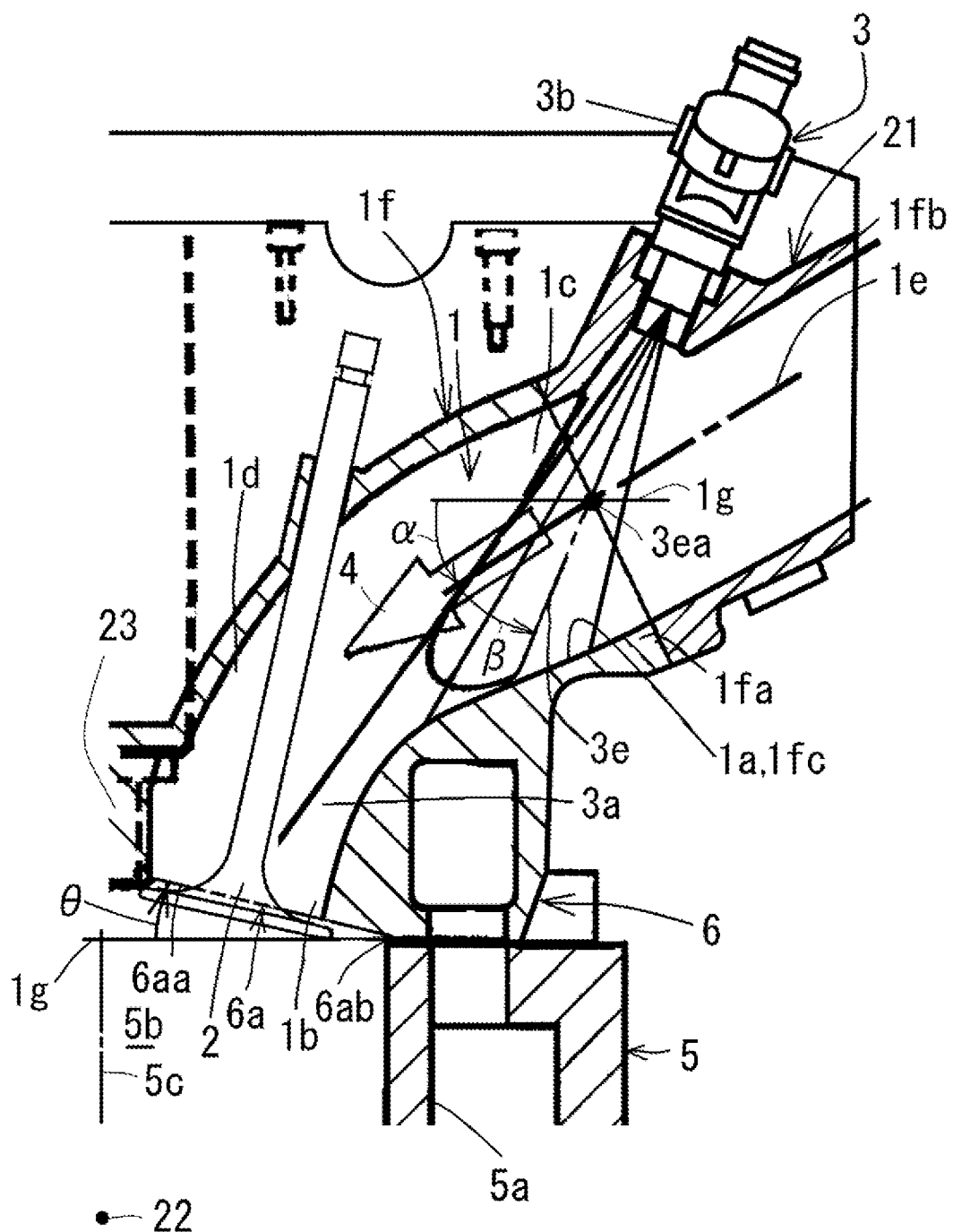
FIG. 3 is an enlarged sectional view of a suction port and some other surrounding parts in FIG. 2.

As illustrated in FIGS. 2 and 3, this engine includes a cylinder block (5) and a cylinder head (6); the cylinder head (6) is attached to the top of the cylinder block (5).

Figure 5:
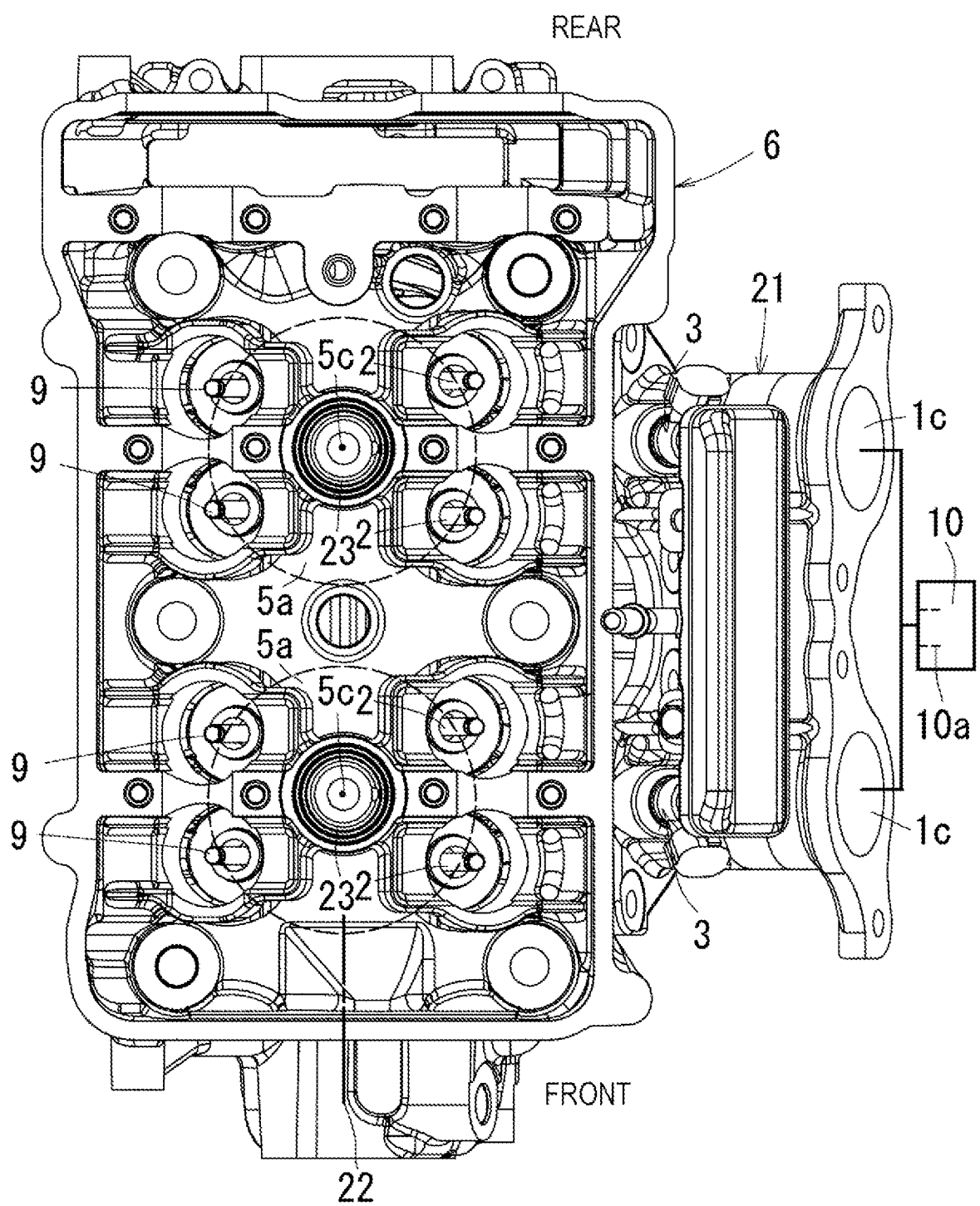
FIG. 5 is a plan view of a cylinder head and an injector holder in the port injection engine according to the embodiment of the present invention.

As illustrated in FIG. 5, the cylinder block (5) includes two cylinders (5a) and (5a) arranged side by side in a front-rear direction that coincides with an extending direction of a crankshaft central axis (22).

As illustrated in FIGS. 2 and 3, fitted into each cylinder (5a) in the cylinder block (5) is a piston head (7) in a vertically movable manner. Each cylinder (5a) contains a combustion chamber (5b).

The cylinder head (6) includes suction ports (1) and exhaust ports (8).

As illustrated in FIGS. 2 and 3, the suction port (1) has suction valve ports (1b) to be opened and closed by suction valves (2), whereas the exhaust port (8) has exhaust valve ports (8a) to be opened and closed by exhaust valves (9).

As illustrated in FIG. 5, each cylinder (5a) is provided with the pair of suction valves (2) and (2) and the pair of exhaust valves (9) and (9). As illustrated in FIG. 5, each cylinder (5a) has a spark plug (23) disposed in the center thereof as viewed from a direction parallel to a pair of cylinder central axes (5c) and (5c). Each spark plug (23) is surrounded by corresponding pairs of suction valves (2) and (2) and exhaust valves (9) and (9).

As illustrated in FIGS. 2 and 3, each of the suction valves (2) and the exhaust valves (9) may be a poppet valve. Each of the suction valves (2) and the exhaust valves (9) is opened by a valve operating cam (not illustrated) to be driven by a crankshaft (not illustrated) and in turn closed by the urging force of a valve spring (not illustrated).

Figure 4A:
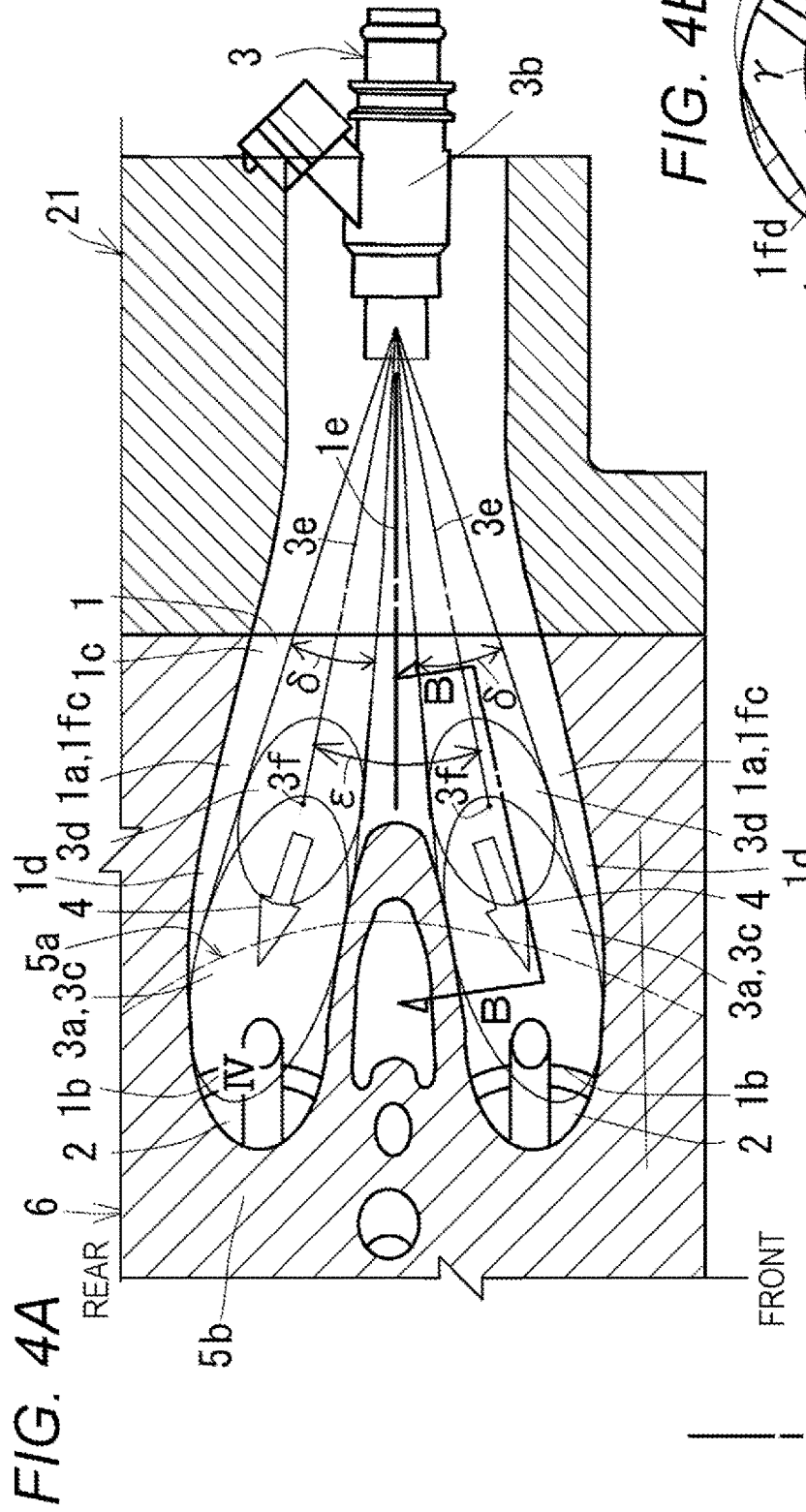
FIG. 4A is a sectional view taken along line IV-IV of FIG. 2.

As illustrated in FIG. 4A, the suction port (1) in each cylinder (5a) includes the pair of suction valve ports (1b) and (1b), an inlet-side port part (1c), and a pair of valve-port-side port parts (1d) and (1d) extending to the suction valve ports (1b) and (1b); the valve-port-side port parts (1d) and (1d) are formed by branching the inlet-side port part (1c) into two.

A port injector (3) injects fuel bifurcately toward the pair of valve-port-side port parts (1d) and (1d).

The cylinder head (6) is attached to an injector holder (21) so that the inlet-side port part (1c) is formed continuously from the cylinder head (6) to the injector holder (21).

As illustrated in FIG. 5, the pair of inlet-side port parts (1c) and (1c) is disposed in the injector holder (21) side by side in the front-rear direction, which coincides with the extending direction of the crankshaft central axis (22).

As illustrated in FIG. 5, the injector holder (21) is coupled to a throttle body (10), which includes a throttle passage (10a) that communicates with the pair of inlet-side port parts (1c) and (1c). As illustrated in FIG. 2, the throttle body (10) further includes: a throttle valve (10b) provided in the throttle passage (10a); and an actuator (10c) provided for the throttle valve (10b). The throttle valve (10b) is coupled to an air cleaner (12) disposed on the suction upstream side. Provided on the suction downstream side of the throttle valve (10b) is a suction pressure sensor (10d). Both of the suction pressure sensor (10d) and the actuator (10c) for the throttle valve (10b) are electrically connected to an engine ECU (11).

ECU, which is an abbreviation for "electronic control unit", may be implemented by a microcomputer.

The engine ECU (11) is also electrically connected to both an accelerator sensor (13) and an engine speed sensor (14).

Similar to the suction port (1), the exhaust port (8), illustrated in FIG. 2, also includes: the pair of exhaust valve ports (8a) and (8a); a valve-port-side port part (8b) in which the pair of exhaust valve ports (8a) and (8a) are joined together; and an outlet-side port part (8c).

As illustrated in FIG. 2, the outlet-side port part (8c) is coupled to an exhaust manifold (15). Disposed on the exhaust downstream side of the exhaust manifold (15) is an O2 sensor (16). Disposed on the exhaust downstream side of the O2 sensor (16) is a three-way catalyst (17). The O2 sensor (16) is electrically connected to the engine ECU (11).

As illustrated in FIG. 2, the port injector (3) is coupled to a fuel tank (19) via a fuel pump (18). The port injector (3) has a solenoid valve (3b), which is electrically connected to the engine ECU (11).

The engine ECU (11) calculates an engine load, based on an accelerator opening and an engine speed and then adjusts an opening of the throttle valve (10b) in accordance with the engine load. In addition, the engine ECU (11) calculates a target air-fuel ratio at which the three-way catalyst (17) can exhibit the best purification rate characteristics, based on an oxygen concentration of an exhaust gas (20) detected by the O2 sensor (16) and then adjusts the amount of fuel injected from the port injector (3).

This engine does not have a direct injection type of fuel injector that injects the fuel directly into the combustion chamber (5b). In fact, the engine injects the fuel from the port injector (3) into the suction ports (1).

As illustrated in FIGS. 2, 3, and 4A, the engine includes the suction ports (1), the suction valves (2), and the port injectors (3) that inject the fuel to inner peripheral surfaces (1a) of the suction ports (1).

Figure 1:
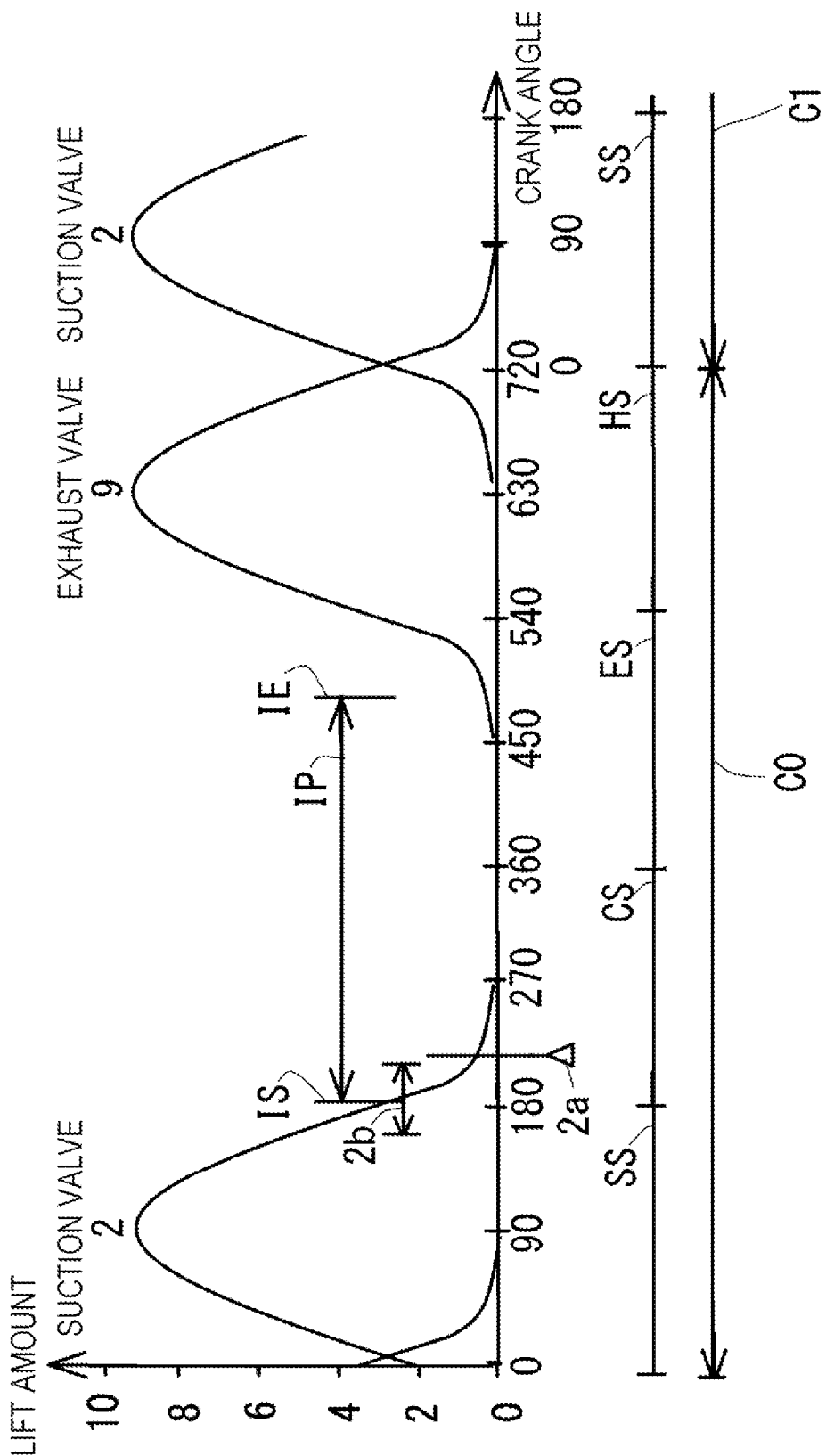
FIG. 1 is an explanatory diagram of combustion cycles and a fuel injection period in a port injection engine according to an embodiment of the present invention.

As illustrated in FIG. 1, the engine is configured such that, when the fuel is burned in a predetermined combustion cycle (C1), an injection start (IS) of a fuel injection period (IP) is set within an end part (2b) of a valve opening period before the suction valve (2) is fully closed (2a), during a combustion cycle (C0) previous to the above combustion cycle (C1).

In the engine, suction air (4) passing through the suction ports (1) blows off injection start fuels (3a), illustrated in FIGS. 2, 3, 4A, and 4B, until the suction valve (2) is fully closed (2a) (see FIG. 1). Then, the suction air (4) hits wide areas on the suction valves (2) and the inner peripheral surfaces (1a) of the suction ports (1) which have been heated by the combustion heat. After that, the suction air (4) absorbs the combustion heat, thereby facilitating the vaporization of the injected fuel inside the suction ports (1). Consequently, the engine has enhanced combustion performance and provides high engine output and exhaust performance.

As illustrated in FIG. 4A, each injection start fuel (3a) forms a large elliptical region (3c), which corresponds to the area on the suction valve (2) and the inner peripheral surface (1a) of the suction port (1) with which the injection start fuel (3a) blown in the suction air (4) is directly made contact. As illustrated in FIG. 4A, each fuel injected after the suction valve (2) has been closed forms a small elliptical region (3d), which corresponds to the area on the inner peripheral surface (1a) of the suction port (1) with which the fuel is directly made contact.

As shown in FIG. 1, the end part (2b) of the valve opening period is set in a range of 50° to 20° before the suction valve (2) is fully closed (2a) at the crank angle.

Unlike the above range, if the injection start (IS) illustrated in FIG. 1 comes before the above range, most of the injection start fuels (3a), illustrated in FIGS. 2, 3, 4A, and 4B, are blown through the suction ports (1), and the injected fuel may fail to readily vaporize inside the suction ports (1). Further, unlike the above range, if the injection start (IS) illustrated in FIG. 1 comes after the above range, the injection start fuels (3a), illustrated in FIGS. 2, 3, 4A, and 4B, fail to hit a wide area on the heated suction valves (2) and the inner peripheral surfaces (1a) of the suction ports (1) over an adequate time. In which case, the injected fuel may fail to readily vaporize inside the suction ports (1).

On the other hand, when the injection start (IS) illustrated in FIG. 1 is set in the above range of 50° to 20°, the above disadvantages are less likely to occur, and the injected fuel readily vaporizes inside the suction ports (1).

When the end part (2b) of the valve opening period is set in the range of 40° to 30° before the suction valve (2) is fully closed (2a) at the crank angle, the engine more reliably produces the above effect.

The opening of the suction valve (2) at the injection start (IS) illustrated in FIG. 1 is set in the range of 25% to 45% relative to the full opening.

Unlike the above range, if the opening of the suction valve (2) at the injection start (IS) illustrated in FIG. 1 is set to less than 25% relative to the full opening, the flow rate of the suction air (4), illustrated in FIGS. 2, 3, 4A, and 4B, may become insufficient to blow off the injection start fuels (3a), and the injected fuel may fail to readily vaporize inside the suction ports (1). Further, unlike the above range, if the opening exceeds 45% relative to the full opening, the flow rate of the suction air (4) may become excessive. In which case, most of the injection start fuels (3a) may pass through the suction ports (1) so that the injected fuel may fail to readily vaporize inside the suction ports (1).

On the other hand, when the opening of the suction valves (2) at the injection start (IS) illustrated in FIG. 1 is set in the above range of 25% to 45%, the above disadvantages are less likely to occur, and the injected fuel readily vaporizes inside the suction ports (1).

Further, when the opening of the suction valves (2) is set in the range of 30% to 40% relative to the full opening, the engine more reliably produces the above effect.

It should be noted that the opening of the suction valves (2) is proportional to the valve opening stroke of the suction valves (2).

As illustrated in FIG. 1, when the fuel is burned in the predetermined combustion cycle (C1), an injection end (IE) of the fuel injection period (IP) is set within an explosion stroke (ES) in the combustion cycle (C0) previous to the above combustion cycle (C1).

Unlike this engine, if the injection end (IE) in FIG. 1, comes after the explosion stroke (ES), the vaporization time of the injection end fuel may become insufficient, in which case the injected fuel may fail to readily vaporize inside the suction ports (1).

In this engine, however, the injection end (IE) in FIG. 1, is set within the explosion stroke (ES), in which case the injected fuel readily vaporizes inside the suction ports (1) without causing the above disadvantage.

As illustrated in FIGS. 2 and 3, the cylinder head (6) is attached to the cylinder block (5) in which the combustion chamber (5b) is provided.

As illustrated in FIGS. 2 and 3, a suction port wall (10 includes a combustion-chamber-side port wall part (1fa) and a combustion-chamber-opposite-side port wall part (1fb) as viewed from the direction parallel to the crankshaft central axis (22). The combustion-chamber-side port wall part (1fa) and the combustion-chamber-opposite-side port wall part (1fb) are defined separately by a suction port central axis (1e) as a boundary.

As illustrated in FIGS. 2 and 3, the port injector (3) is attached onto the combustion-chamber-opposite-side port wall part (1fb). A fuel injection central axis (3e) of the port injector (3) is directed to an inner peripheral surface (1fc) of the combustion-chamber-side port wall part (1fa).

In this engine, when the port injector (3), illustrated in FIGS. 2 and 3, injects the fuel, the injected fuel hits and adheres to the inner peripheral surface (1fc) of the combustion-chamber-side port wall part (1fa) and then efficiently absorbs the combustion heat transmitted from the combustion chamber (5b), so that the injected fuel readily vaporizes inside the suction port (1).

As illustrated in FIGS. 2 and 3, the cylinder head (6) is attached to the injector holder (21).

As illustrated in FIGS. 2 and 3, the suction port (1) is formed from the cylinder head (6) to the injector holder (21). The port injector (3) is attached onto the combustion-chamber-opposite-side port wall part (1fb) of the injector holder (21).

In this engine, the port injector (3) does not interfere with the mounting of other components of the cylinder head (6).

As illustrated in FIGS. 2 and 3, the suction port (1) includes the inlet-side port part (1c) having the suction port central axis (1e) in a linear shape, and the valve-port-side port part (1d) being curved in an arc shape from the inlet-side port part (1c) to the suction valve port (1b) of the suction valve (2).

Here, as viewed from the direction parallel to the crankshaft central axis (22) in FIG. 3, the suction port central axis (1e) of the inlet-side port part (1c) which has a linear shape, an intersection (3ea) at which the suction port central axis (1e) having a linear shape intersects the fuel injection central axis (3e), and an engine-width-direction virtual line (1g) directed perpendicularly to the cylinder central axis (5c) are taken into account.

As viewed from the direction parallel to the crankshaft central axis (22) in FIG. 3, the inclination of the inlet-side port part (1c) is determined such that a dip angle (α) is set in the range of 20° to 40°; the dip angle (α) refers to the angle between the engine-width-direction virtual line (1g) passing through the intersection (3ea) and the suction port central axis (1e) having a linear shape.

Unlike this engine, if the dip angle (α) is less than 20°, the curvature of the valve-port-side port part (1d) may excessively increase. In which case, the suction resistance may increase, thereby increasing the risk of a suction efficiency being lowered. If the dip angle (α) exceeds 40°, the curvature of the valve-port-side port part (1d) may excessively decrease. In which case, when the injected fuel hits the inner peripheral surface (1fc) of the combustion-chamber-side port wall part (1fa), most of the injected fuel may pass through the suction valve port (1b) without hitting the suction valve (2). As a result, the injected fuel may fail to readily vaporize inside the suction ports (1).

In this engine, however, the dip angle (α) is set in the range of 20° to 40°, so that the above disadvantage is less likely to occur. Thus, the engine exhibits high suction efficiency, thereby enabling the injected fuel to readily vaporize inside the suction ports (1).

When the dip angle (α) is set in the range of 25° to 35°, the engine more reliably produces the above effect.

As viewed from the direction parallel to the crankshaft central axis (22) in FIG. 3, a dip angle (β) is set in the range of 30° to 50°; the dip angle (β) refers to the angle between the suction port central axis (1e) having a linear shape of the inlet-side port part (1c) and the fuel injection central axis (3e).

Unlike this engine, if the dip angle (β) is less than 30°, the injected fuel is excessively blown by the suction air, so that most of the injection start fuel (3a) may pass through the suction ports (1), and the injected fuel may fail to readily vaporize inside the suction ports (1). If the dip angle (β) exceeds 50°, the flight distance of the injected fuel may be excessively shortened, in which case the injected fuel may fail to readily vaporize inside the suction ports (1).

In this engine, however, the dip angle (β) is set in the range of 30° to 50°, so that the injected fuel readily vaporizes inside the suction port (1) without causing the above disadvantage.

When the dip angle (β) is set in the range of 35° to 45°, the engine more reliably produces the above effect.

As illustrated in FIGS. 2, 3, 4A, and 4B, the fuel injection central axis (3e) is directed to the inner peripheral surface (1fc) of the combustion-chamber-side port wall part (1fa) disposed at the end of the inlet-side port part (1c).

Figure 4B:
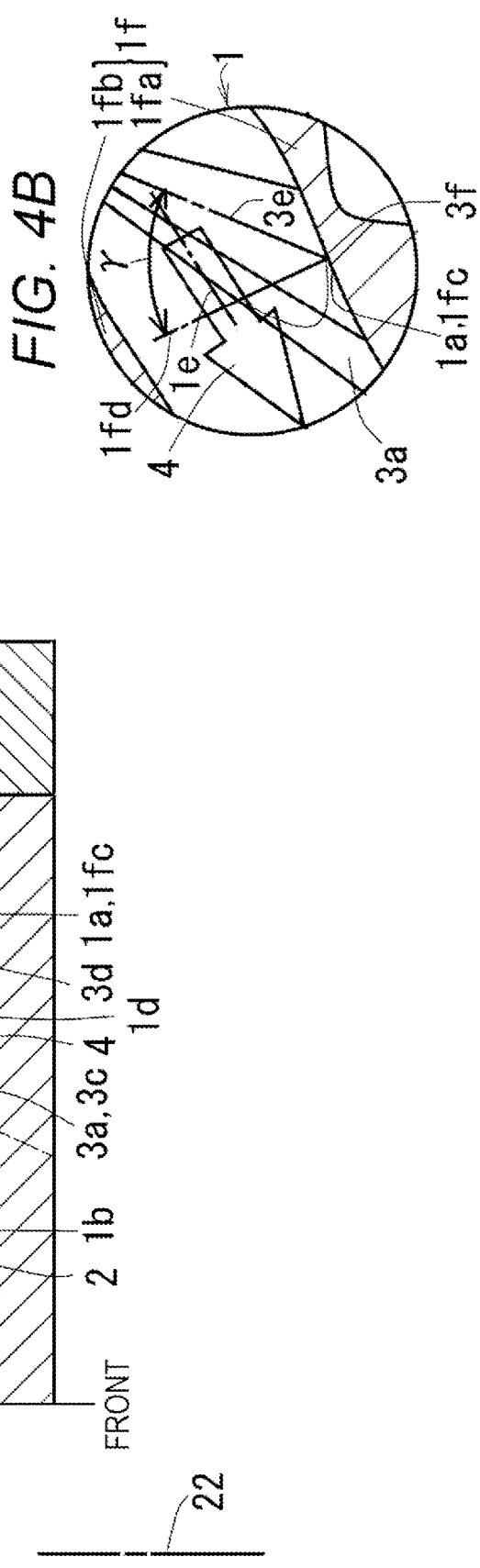
FIG. 4B is a sectional view taken along line B-B in FIG. 4A.

As illustrated in FIG. 4B, the inclination of the fuel injection central axis (3e) (see FIGS. 2, 3, 4A, and 4B) is determined such that a central axis incidence angle (γ) is set in the range 35° to 55°; the central axis incidence angle (γ) refers to the angle between the inner peripheral surface (1fc) of the combustion-chamber-side port wall part (1fa) and the fuel injection central axis (3e).

Unlike this engine, if the central axis incidence angle (γ), illustrated in FIG. 4B, is less than 35°, when the injected fuel hits the inner peripheral surface (1fc) of the combustion-chamber-side port wall part (1fa), most of the injected fuel is reflected and flows along a normal (1fd) that stands upright from the inner peripheral surface (1fc). As a result, the injected fuel is less likely to flow to the suction valve (2) so that only a small amount of injected fuel hits the suction valve (2). In which case, the injected fuel may fail to readily vaporize inside the suction ports (1). If the central axis incidence angle (γ) exceeds 55°, when the injected fuel hits the inner peripheral surface (1fc) of the combustion-chamber-side port wall part (1fa), most of the injected fuel is hardly reflected from the inner peripheral surface (1fc). Then, the injected fuel flows along the inner peripheral surface (1fc) and enters the combustion chamber (5b) through gaps of the suction valve ports (1b) illustrated in FIG. 4A. As a result, the injected fuel may fail to readily vaporize inside the suction ports (1).

In this engine, however, the central axis incidence angle (γ) is set in the range of 35° to 55°, in which case the injection fuel readily vaporizes inside the suction ports (1) without causing the above disadvantage.

When the central axis incidence angle (γ) is set in the range of 40° to 50°, the engine more reliably produces the above effect.

Here, the central axis incidence angle (γ), illustrated in FIG. 4B, between the inner peripheral surface (1fc) of the combustion-chamber-side port wall part (1fa) and the fuel injection central axis (3e) equates with the angle between the fuel injection central axis (3e) and the normal (1fd), where an incident point (3f) of the fuel injection central axis (3e), the tangent of the inner peripheral surface (1fc) of the combustion-chamber-side port wall part (1fa) at the incident point (3f), and the normal (1fd) that stands perpendicular to this tangent are taken into account.

FIG. 4B is a sectional view taken along line B-B of FIG. 4A or along the fuel injection central axis (3e) and the normal (1fd) of FIG. 4A.

As illustrated in FIGS. 2 and 3, the combustion chamber (5b) includes a ceiling surface (6a) having a roof vent shape which is inserted into the cylinder head (6). Further, the ceiling surface (6a) has a suction-side slope (6aa) that opens the suction valve port (1b).

As viewed from the direction parallel to the crankshaft central axis (22) in FIG. 3, a recessed opening edge (6ab) of the suction-side slope (6aa) and the engine-width-direction virtual line (1*g*) directed perpendicularly to the cylinder central axis (5*c*) are taken into account.

As viewed from the direction parallel to the crankshaft central axis (22) in FIG. 3, an elevation angle (θ) is set in the range of 5° to 15°; the elevation angle (θ) refers to the angle between the suction-side slope (6*aa*) and the engine-width-direction virtual line (1*g*) passing through the recessed opening edge (6*ab*) of the suction-side slope (6*aa*).

Unlike this engine, if the elevation angle (θ), illustrated in FIG. 3, is less than 5°, the area of the suction-side slope (baa) may excessively decrease to reduce the opening area of the suction valve port (1*b*), thereby increasing the risk of the suction efficiency being lowered. If the elevation angle (θ), illustrated in FIG. 3, exceeds 15°, the curvature of the valve-port-side port part (1*d*) may excessively decrease. In which case, when the injected fuel hits the inner peripheral surface (1*fc*) of the combustion-chamber-side port wall part (1*fa*), most of the injected fuel may pass through the suction valve port (1*b*) without hitting the suction valve (2). As a result, the injected fuel may fail to readily vaporize inside the suction ports (1).

In this engine, however, the above elevation angle (θ) is set in the range of 5° to 15°, so that the above disadvantage is less likely to occur. Thus, the engine exhibits high suction efficiency, thereby enabling the injected fuel to readily vaporize inside the suction ports (1).

When the elevation angle (θ) is set within the range of 7° to 13°, the engine more reliably produces the above effect.

As illustrated in FIG. 4A, the fuel injection central axes (3*e*) of the port injector (3) is oriented toward the suction valves (2).

As illustrated in FIG. 4A, spray spread angles (6) of the fuel injected from the port injector (3) are each set in the range of 6° to 26°.

Unlike this engine, if each spray spread angle (δ), illustrated in FIG. 4A, is less than 6°, each spray spread angle (δ) may become too small for the injected fuel to diffuse inside the suction ports (1), and the injected fuel may fail to readily vaporize inside the suction ports (1). If each spray spread angle (δ) exceeds 26°, each spray spread angle (δ) becomes too large to ensure a sufficient flight distance of the injected fuel, and thus the injected fuel may fail to readily vaporize inside the suction ports (1).

In this engine, however, each spray spread angle (δ) is set in the range of 6° to 26°, so that the injected fuel readily vaporizes inside the suction port (1) without causing the above disadvantage.

When the spray spread angle (δ) is set in the range of 12° to 20°, the engine more reliably produces the above effect.

As illustrated in FIG. 4A, the suction port (1) includes the pair of valve-port-side port parts (1*d*) and (1*d*) extending separately toward the pair of suction valve ports (1*b*) and (1*b*).

The port injector (3) includes the pair of fuel injection central axes (3*e*) and (3*e*) extending to the pair of valve-port-side port parts (1*d*) and (1*d*).

As illustrated in FIG. 4A, the pair of fuel injection central axes (3*e*) and (3*e*) extending to the pair of valve-port-side port parts (1*d*) and (1*d*) are oriented toward the suction valves (2).

In this engine, the port injector (3) separately injects the fuel to the pair of valve-port-side port parts (1*d*) and (1*d*) so as to uniformly spray the injected fuel inside the suction port (1), thereby facilitating the vaporization of the injected fuel inside the suction ports (1).

As illustrated in FIG. 4A, a central axis expansion angle (c) is set in the range of 10° to 30°; the central axis expansion angle (c) refers to the angle between the pair of fuel injection central axes (3*e*) and (3*e*).

Unlike this engine, if the central axis expansion angle (c), illustrated in FIG. 4A, is less than 10°, the pair of paths for the injected fuel is disposed too close to each other, so that droplets of the injected fuel flowing along the respective paths may be brought into contact and mixed with one another. In which case, the injected fuel may fail to readily vaporize inside the suction ports (1). If the central axis expansion angle (c) exceeds 30°, a non-injected region defined between the pair of paths for the injected fuels becomes too large. In which case, the diffusion of the injected fuel into the non-injection region may delay, so that the injected fuel may fail to readily vaporize inside the suction ports (1).

In this engine, however, the above central axis expansion angle (c) is set in the range of 10° to 30°, in which case the injection fuel readily vaporizes inside the suction ports (1) without causing the above disadvantage.

When the central axis expansion angle (c) is set in the range of 15° to 25°, the engine more reliably produces the above effect.

What is claimed is:

1. A port injection engine comprising:
   a suction port;
   a suction valve; and
   a port injector that injects fuel to an inner peripheral surface of the suction port, and
   an engine ECU, wherein
   the port injector is electrically connected to the engine ECU, and
   the engine ECU is configured such that when the fuel is burned in a predetermined combustion cycle, an injection start of a fuel injection period is set within an end part of a valve opening period before the suction valve is fully closed, during a combustion cycle previous to the predetermined combustion cycle.

2. The port injection engine according to claim 1, wherein the end part of the valve opening period is set in a range of 50° to 20° before the suction valve is fully closed at a crank angle.

3. The port injection engine according to claim 1, wherein an opening of the suction valve at an injection start is set in a range of 25% to 45% relative to full opening.

4. The port injection engine according to claim 2, wherein an opening of the suction valve at an injection start is set in a range of 25% to 45% relative to full opening.

5. The port injection engine according to claim 1, wherein when the fuel is burned in the predetermined combustion cycle, an injection end of the fuel injection period is set within an explosion stroke in the combustion cycle previous to the predetermined combustion cycle.

6. The port injection engine according to claim 2, wherein when the fuel is burned in the predetermined combustion cycle, an injection end of the fuel injection period is set within an explosion stroke in the combustion cycle previous to the predetermined combustion cycle.

7. The port injection engine according to claim 3, wherein when the fuel is burned in the predetermined combustion cycle, an injection end of the fuel injection period is set within an explosion stroke in the combustion cycle previous to the predetermined combustion cycle.

8. The port injection engine according to claim 4, wherein when the fuel is burned in the predetermined combustion cycle, an injection end of the fuel injection period is set within an explosion stroke in the combustion cycle previous to the predetermined combustion cycle.

9. The port injection engine according to claim 1, wherein
a cylinder head is attached to a cylinder block in which a combustion chamber is provided,
as viewed from a direction parallel to a crankshaft central axis, a suction port wall includes a combustion-chamber-side port wall part and a combustion-chamber-opposite-side port wall part that are separated from each other by a suction port central axis as a boundary,
the port injector is attached onto the combustion-chamber-opposite-side port wall part, and
a fuel injection central axis of the port injector is directed to an inner peripheral surface of the combustion-chamber-side port wall part.

10. The port injection engine according to claim 2, wherein
a cylinder head is attached to a cylinder block in which a combustion chamber is provided,
as viewed from a direction parallel to a crankshaft central axis, a suction port wall includes a combustion-chamber-side port wall part and a combustion-chamber-opposite-side port wall part that are separated from each other by a suction port central axis as a boundary,
the port injector is attached onto the combustion-chamber-opposite-side port wall part, and
a fuel injection central axis of the port injector is directed to an inner peripheral surface of the combustion-chamber-side port wall part.

11. The port injection engine according to claim 3, wherein
a cylinder head is attached to a cylinder block in which a combustion chamber is provided,
as viewed from a direction parallel to a crankshaft central axis, a suction port wall includes a combustion-chamber-side port wall part and a combustion-chamber-opposite-side port wall part that are separated from each other by a suction port central axis as a boundary,
the port injector is attached onto the combustion-chamber-opposite-side port wall part, and
a fuel injection central axis of the port injector is directed to an inner peripheral surface of the combustion-chamber-side port wall part.

12. The port injection engine according to claim 4, wherein
a cylinder head is attached to a cylinder block in which a combustion chamber is provided,
as viewed from a direction parallel to a crankshaft central axis, a suction port wall includes a combustion-chamber-side port wall part and a combustion-chamber-opposite-side port wall part that are separated from each other by a suction port central axis as a boundary,
the port injector is attached onto the combustion-chamber-opposite-side port wall part, and
a fuel injection central axis of the port injector is directed to an inner peripheral surface of the combustion-chamber-side port wall part.

13. The port injection engine according to claim 9, wherein
the suction port is formed from the cylinder head to the injector holder, and the port injector is attached onto the combustion-chamber-opposite-side port wall part of the injector holder.

14. The port injection engine according to claim 9, wherein
the suction port includes an inlet-side port part and a valve-port-side port part, the inlet-side port part having a linear suction port central axis, the valve-port-side port part being curved in an arc shape from the inlet-side port part to a suction valve port of the suction valve,
as viewed from the direction parallel to the crankshaft central axis, the linear suction port central axis of the inlet-side port part, an intersection at which the linear suction port central axis intersects the fuel injection central axis, and an engine-width-direction virtual line directed perpendicularly to a cylinder central axis are taken into account, and
as viewed from the direction parallel to the crankshaft central axis, an inclination of the inlet-side port part is determined such that a dip angle is set in a range of 20° to 40°, the dip angle being an angle between the engine-width-direction virtual line passing through the intersection and the linear suction port central axis.

15. The port injection engine according to claim 14, wherein
as viewed from the direction parallel to the crankshaft central axis, a dip angle is set in a range of 30° to 50°, the dip angle being an angle between the linear suction port central axis of the inlet-side port part and the fuel injection central axis.

16. The port injection engine according to claim 9, wherein
the fuel injection central axis is directed to the inner peripheral surface of the combustion-chamber-side port wall part disposed at an end of the inlet-side port part, and
an inclination of the fuel injection central axis is determined such that a central axis incidence angle is set in a range of 35° to 55°, the central axis incidence angle being an angle between the fuel injection central axis and the inner peripheral surface of the combustion-chamber-side port wall part.

17. The port injection engine according to claim 9, wherein
the combustion chamber includes a combustion chamber ceiling surface of a roof vent shape which is inserted into the cylinder head, the combustion chamber ceiling surface having a suction-side slope that opens a suction valve port,
as viewed from the direction parallel to the crankshaft central axis, a recessed opening edge of the suction-side slope and an engine-width-direction virtual line directed perpendicularly to a cylinder central axis are taken into account, and
as viewed from the direction parallel to the crankshaft central axis, an elevation angle is set in a range of 5° to 15°, the elevation angle being an angle between the suction-side slope and the engine-width-direction virtual line passing through the recessed opening edge on the suction-side slope.

18. The port injection engine according to claim 1, wherein
a fuel injection central axis of the port injector is oriented toward the suction valve, and
a spray spread angle of the fuel injected from the port injector is set in a range of 6° to 26°.

19. The port injection engine according to claim 1, wherein
the suction port includes a pair of valve-port-side port parts that extends separately toward a pair of suction valve ports,
the port injector has a pair of fuel injection central axes extending to the pair of valve-port-side port parts, and the pair of fuel injection central axes extending to the pair of valve-port-side port parts are oriented toward the suction valve.

20. The port injection engine according to claim 19, wherein
a central axis expansion angle between the pair of fuel injection central axes is set in a range of 10° to 30°.

* * * * *